（12） United States Patent
Lai

(10) Patent No.: US 9,876,692 B2
(45) Date of Patent: Jan. 23, 2018

(54) CLOUD-BASED MONITORING APPARATUS

(71) Applicant: GROWTHMENT TECHNOLOGY CO., LTD., Taipei (TW)

(72) Inventor: Wen-Kuo Lai, Taipei (TW)

(73) Assignee: GROWTHMENT TECHNOLOGY CO., LTD., Taipei (TW)

( * ) Notice: Subject to any disclaimer, the term of this patent is extended or adjusted under 35 U.S.C. 154(b) by 724 days.

(21) Appl. No.: 14/272,775

(22) Filed: May 8, 2014

(65) Prior Publication Data
US 2015/0149617 A1 May 28, 2015

(30) Foreign Application Priority Data

Nov. 22, 2013 (TW) .............................. 102142654 A

(51) Int. Cl.
*H04L 12/26* (2006.01)
*H04Q 9/00* (2006.01)

(52) U.S. Cl.
CPC ............... *H04L 43/08* (2013.01); *H04Q 9/00* (2013.01); *H04Q 2209/20* (2013.01); *H04Q 2209/40* (2013.01); *Y02P 90/84* (2015.11)

(58) Field of Classification Search
CPC ...... H04L 43/08; H04Q 9/00; H04Q 2209/20; H04Q 2209/40
See application file for complete search history.

(56) References Cited

U.S. PATENT DOCUMENTS

| 2004/0044493 A1* | 3/2004 | Coulthard | G06Q 50/22 702/122 |
| 2004/0153481 A1* | 8/2004 | Talluri | G06F 3/0607 |
| 2007/0219652 A1* | 9/2007 | McMillan | A01K 63/04 700/83 |
| 2007/0251461 A1* | 11/2007 | Reichard | A01K 63/006 119/245 |
| 2009/0200245 A1* | 8/2009 | Steinbrueck | C02F 1/008 210/741 |
| 2011/0197082 A1* | 8/2011 | Ingels | H04L 12/10 713/310 |

FOREIGN PATENT DOCUMENTS

CN 102645927 * 4/2014

* cited by examiner

*Primary Examiner* — Philip Chea
*Assistant Examiner* — Wuji Chen
(74) *Attorney, Agent, or Firm* — WPAT, PC

(57) ABSTRACT

A cloud-based monitoring apparatus includes a cloud-based network system, a cloud-based database connected with the cloud-based network system, at least one gateway control unit connected with the cloud-based network system, at least one mobile apparatus connected signally with the cloud-based database, at least one basic detection module connected signally with the gateway control unit, at least one serial bus module connected signally with the gateway control unit, at least one analog I/O module connected signally with the gateway control unit, at least one digital I/O module connected signally with the gateway control unit, and an ISP connected signally with the cloud-based database. The gateway control unit, the basic detection module, the serial bus module, the analog I/O module, and the digital I/O module are all mounted in a monitored environment and have at least individual monitor parameters.

10 Claims, 9 Drawing Sheets

CLOUD-BASED MONITORING APPARATUS

This application claims the benefit of Taiwan Patent Application Serial No. 102142654, filed Nov. 22, 2013, the subject matter of which is incorporated herein by reference.

BACKGROUND OF INVENTION

1. Field of the Invention

The invention relates to a monitoring apparatus, and more particularly to a cloud-based monitoring apparatus.

2. Description of the Prior Art

In the art of the monitoring apparatuses, the user needs to access the monitoring/control sensors so as able to retrieve the detection signals therefrom. Any abnormal situation of the monitored environment is also up to human judgments. Definitely, necessary switching upon appropriate equipments is also done by human labor so as to correct the abnormal situation of the monitored environment. For example, in the case that the water temperature of the monitored environment of the fish-cultivating pond is too low, then the ventilation system will be functioned or the heating rods would be energized so as to warm up the water temperature of the monitored environment of the fish-cultivating pond. In the art, such a response in heating up the water temperature is always time-consuming and labor-costing. If the monitored environment exists in a general farm, a livestock farm and a fish farm accompanied by a chicken farm, a bullpen, a hog pen, a fish-cultivating pond, or a plant glasshouse, then the monitor parameters of the monitored environment, such as the temperature, the humidity, the luminance, the security setups and so on, would be complicated and all are varied from time to time. It is definite that the management work at monitoring these parameters would be a tragedy to the management level.

In the art of the monitoring apparatuses for the cultivation, the cloud-based, the cloud-side or, simply the cloud control is new. Therefore, with the recent development in cloud technology, it can be time-saving and handy to introduce the cloud-based control and monitoring to the cultivation so as to improve the management upon those complicated monitor parameters, and so as thereby to improve the production efficiency of the monitored environment.

Further, in the art of the monitoring technology for the medical/nursing facilities, parking lots, hotels, buildings, hospitals, schools and factories, the monitor/control center is usually seen to perform the control/monitoring management without a cloud-based database for data integration. In addition, there is also no user interface module to bridge the mobile apparatus and the control module in a cloud manner so as to control the distant monitored environment.

SUMMARY OF THE INVENTION

Accordingly, it is the primary object of the present invention to provide a cloud-based monitoring apparatus, by which the monitor parameters in the monitored environment can be integrated by the cloud, so as to further integrate the switch control state, the basic detection state, the apparatus connection state via the serial bus, the apparatus connection state via the analog input/output, and the apparatus connection state via the digital input/output of the involved apparatuses; such that the far-end information can be provided to the data-storage module, the alarm/message notification module, the switch-state determination module, the gateway communication module, and the safety module. Further, through the verification module to distinguish the retailer group and the customer group and to further determine the user's authorization, then the mobile apparatus can be directed into the corresponding user interface module. The mobile apparatus further connects a cloud-based database that performs a control center of the cloud-based monitoring apparatus. One end of the cloud-based database is connected, through the cloud, to the basic detection module, the serial bus module, the analog I/O module, and the digital I/O module of the monitored environment so as to provide the user a time-saving, labor-saving, systematic and high-efficient management. The cloud-based monitoring apparatus of the present invention can further integrate the retailer group and the customer group so as to co-manage the cloud-based monitoring apparatus. In the present invention, the basic detection state includes the temperature, the humidity, the luminance and so on, the analog I/O state includes the water quality, the gas, the electric current, the voltage, the special temperature detection and so on, and the digital I/O state includes the raindrop, the infrared, the ultraviolet, the smoke, the reed switch, the power interruption detection, the switch control and so on.

In one embodiment of the present invention, the cloud-based monitoring apparatus includes a cloud-based network system, a cloud-based database, at least one gateway control unit, at least one mobile apparatus, at least one basic detection module, at least one serial bus module, at least one analog I/O module, at least one digital I/O module, and an internet service provider (ISP), in which the cloud-based database is connected with the cloud-based network system, the at least one gateway control unit is also connected with the cloud-based network system, the at least one mobile apparatus is connected signally with the cloud-based database, the at least one basic detection module is connected signally with the gateway control unit, the at least one serial bus module is connected signally with the gateway control unit, the at least one analog I/O module is connected signally with the gateway control unit, the at least one digital I/O module is connected signally with the gateway control unit, and the ISP is connected signally with the cloud-based database. Also, the gateway control unit, the basic detection module, the serial bus module, the analog I/O module, and the digital I/O module are all mounted in the monitored environment, in which each of the gateway control unit, the basic detection module, the serial bus module, the analog I/O module and the digital I/O module has at least one monitor parameter.

All these objects are achieved by the cloud-based monitoring apparatus described below.

BRIEF DESCRIPTION OF THE DRAWINGS

The present invention will now be specified with reference to its preferred embodiment illustrated in the drawings, in which:

FIG. 8 is a preferred embodiment of the gateway communication module in accordance with the present invention; and.

DESCRIPTION OF THE PREFERRED EMBODIMENT

The invention disclosed herein is directed to a cloud-based monitoring apparatus. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
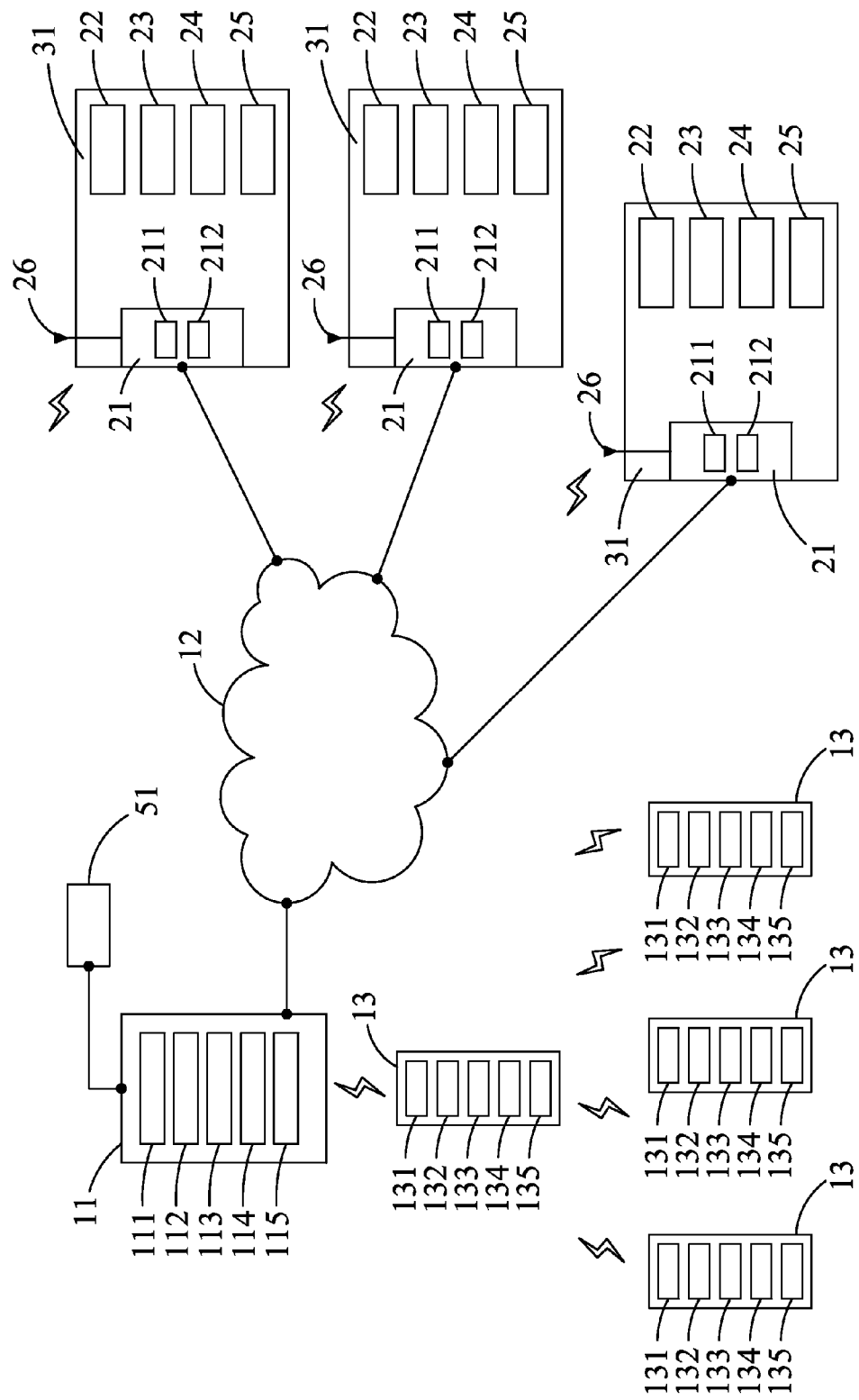
FIG. 1 is a preferred embodiment of the cloud-based monitoring apparatus in accordance with the present invention.

Referring now to FIG. 1, a preferred embodiment of the cloud-based monitoring apparatus in accordance with the present invention includes a cloud-based network system 12, a cloud-based database 11, at least one gateway control unit 21, at least one mobile apparatus 13, at least one basic detection module 22, at least one serial bus module 23, at least one analog I/O module 24, at least one digital I/O module 25, and an Internet Service Provider (ISP) 51; in which the cloud-based database 11 is connected with the cloud-based network system 12, the at least one gateway control unit 21 is connected with the cloud-based network system 12, the at least one mobile apparatus 13 is connected signally with the cloud-based database 11, the at least one basic detection module 22 is connected signally with the gateway control unit 21, the at least one serial bus module 23 is connected signally with the gateway control unit 21, the at least one analog I/O module 24 is connected signally with the gateway control unit 21, the at least one digital I/O module 25 is connected signally with the gateway control unit 21, and the ISP 51 is connected signally with the cloud-based database 11. Also, the gateway control unit 21, the basic detection module 22, the serial bus module 23, the analog I/O module 24, and the digital I/O module 25 are all mounted in the monitored environment, in which each of the gateway control unit 21, the basic detection module 22, the serial bus module 23, the analog I/O module 24 and the digital I/O module 25 has at least one monitor parameter.

Figure 2:
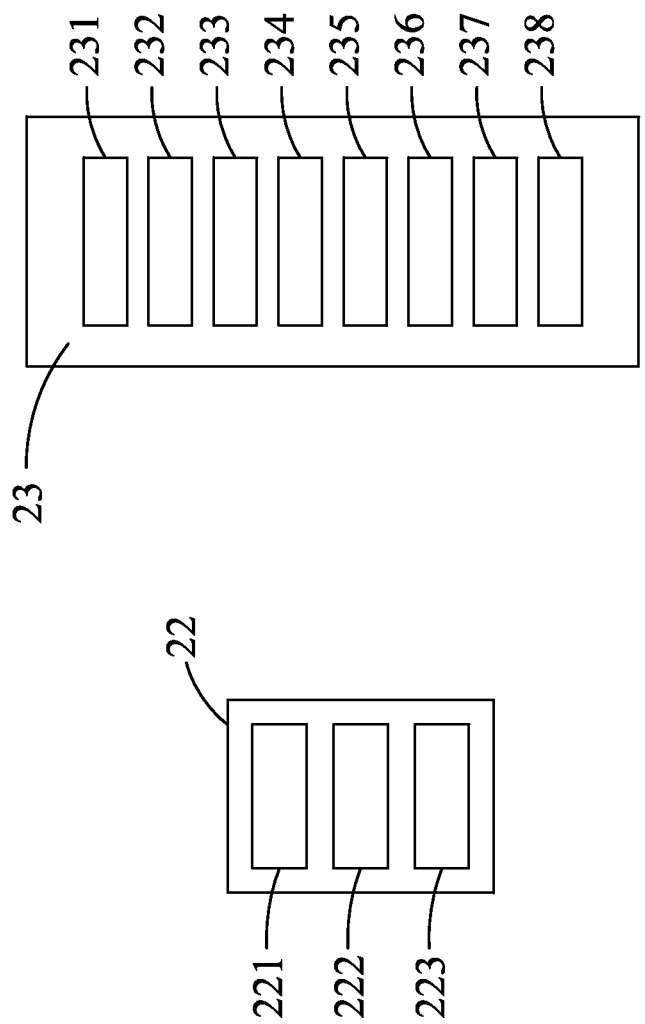
FIG. 2 is a preferred embodiment of the basic detection module in accordance with the present invention.

Referring to FIG. 2, the basic detection module 22 of the present invention further includes a temperature sensor 221, a humidity sensor 222, and a luminance sensor 223; in which the temperature sensor 221 is to detect the temperature of the monitored environment 31, the humidity sensor 222 is to detect the humidity of the monitored environment 31, and the luminance sensor 223 is to detect the luminance of the monitored environment 31.

Referring also to FIG. 2, the serial bus module 23 of the present invention can be performed as a 485 bus interface or a 422 bus interface to connect with the corresponding 485 I/O controller or the corresponding 422 I/O controller, respectively. The peripherals controlled by the 485 I/O controller and the 422 I/O controller can include a fingerprint identification machine 231, an IC access card reader 232, a weight recorder 233, a radio frequency identification device (RFID) 234, an iris recognition device 235, a pluviograph 236, a mobile object flow recorder 237, and a temperature controller 238.

Figure 3:
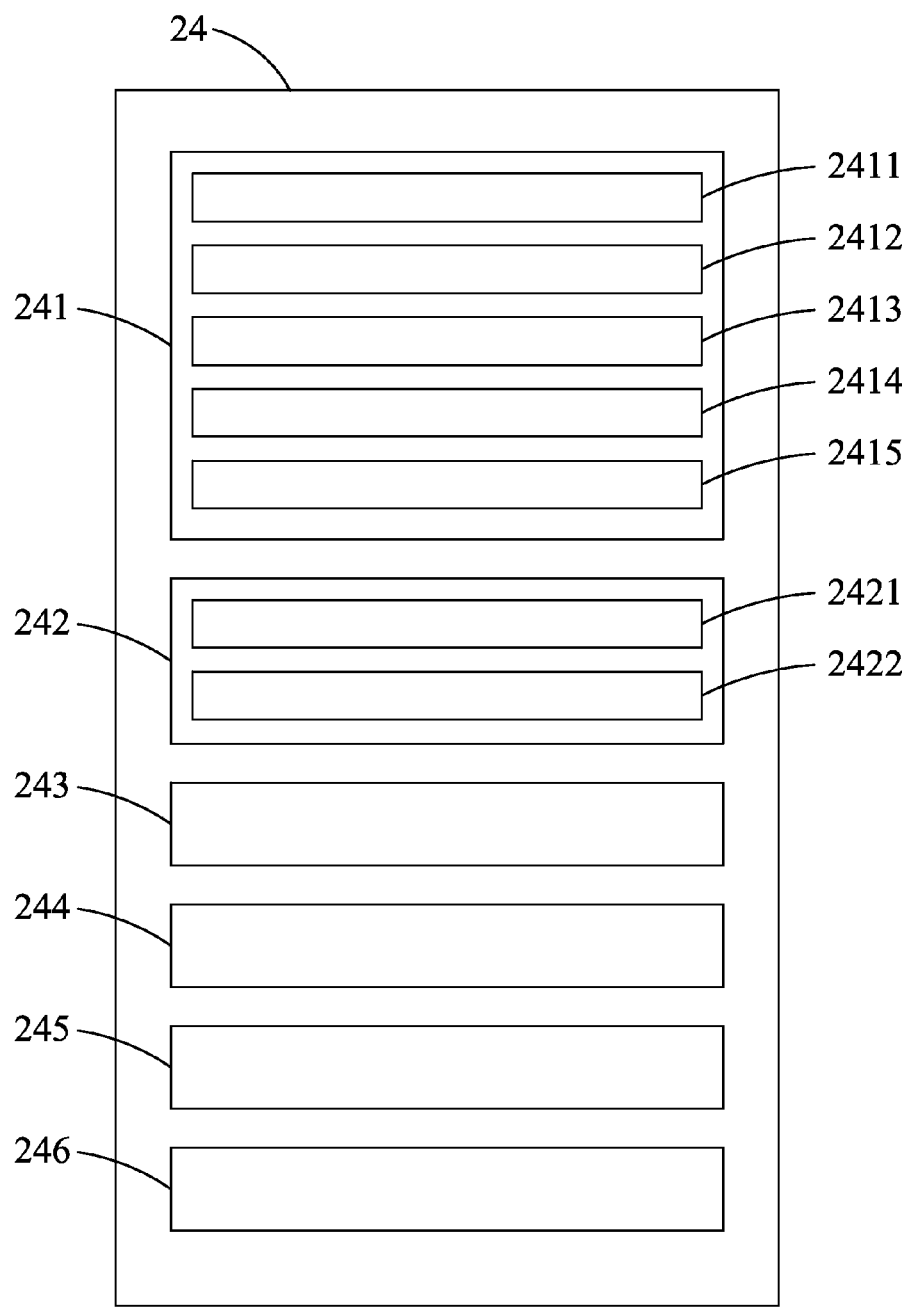
FIG. 3 is a preferred embodiment of the analog I/O module in accordance with the present invention.

Referring now to FIG. 3, the analog I/O module 24 of the present invention further includes a water quality detection module 241, a gas detection module 242, a current detection module 243, a voltage detection module 244, and a special temperature detection module 245, and a PID control module 246; in which the water quality detection module 241 is to detect the water quality of the monitored environment 31, the gas detection module 242 is to detect the air quality of the monitored environment 31, the current detection module 243 is to detect the current between 4 mA~20 mA of the monitored environment 31, the voltage detection module 244 is to detect the voltage ranged between 0~10V of the monitored environment 31, and the special temperature detection module 245 is to detect the temperature between −80° C.~400° C. of the monitored environment 31, and the PID control module 246 is to control the output power for stabilize the monitored environment 31 by proportional, derivative or integral control method.

Referring also to FIG. 3, the water quality detection module 241 of the present invention further includes an ammonia sensor 2411, a dissolved oxygen probe 2412, a pH sensor 2413, a conductivity measuring sensor 2414, and an ORP meter 2415; in which the ammonia sensor 2411 is to detect the ammonia state in the water of the monitored environment 31, the dissolved oxygen probe 2412 is to detect the oxygen state in the water of the monitored environment 31, the pH sensor 2413 is to detect the pH state in the water of the monitored environment 31, the conductivity measuring sensor 2414 is to detect the conductivity of the water of the monitored environment 31, and the ORP meter 2415 is to detect the ORP state in the water of the monitored environment 31.

Referring also to FIG. 3, the gas detection module 242 of the present invention can include a $CO_2$ sensor 2421 and a CO sensor 2422; in which the $CO_2$ sensor 2421 is to detect the $CO_2$ state of the monitored environment 31, and the CO sensor 2422 is to detect the CO state of the monitored environment 31.

Figure 4:
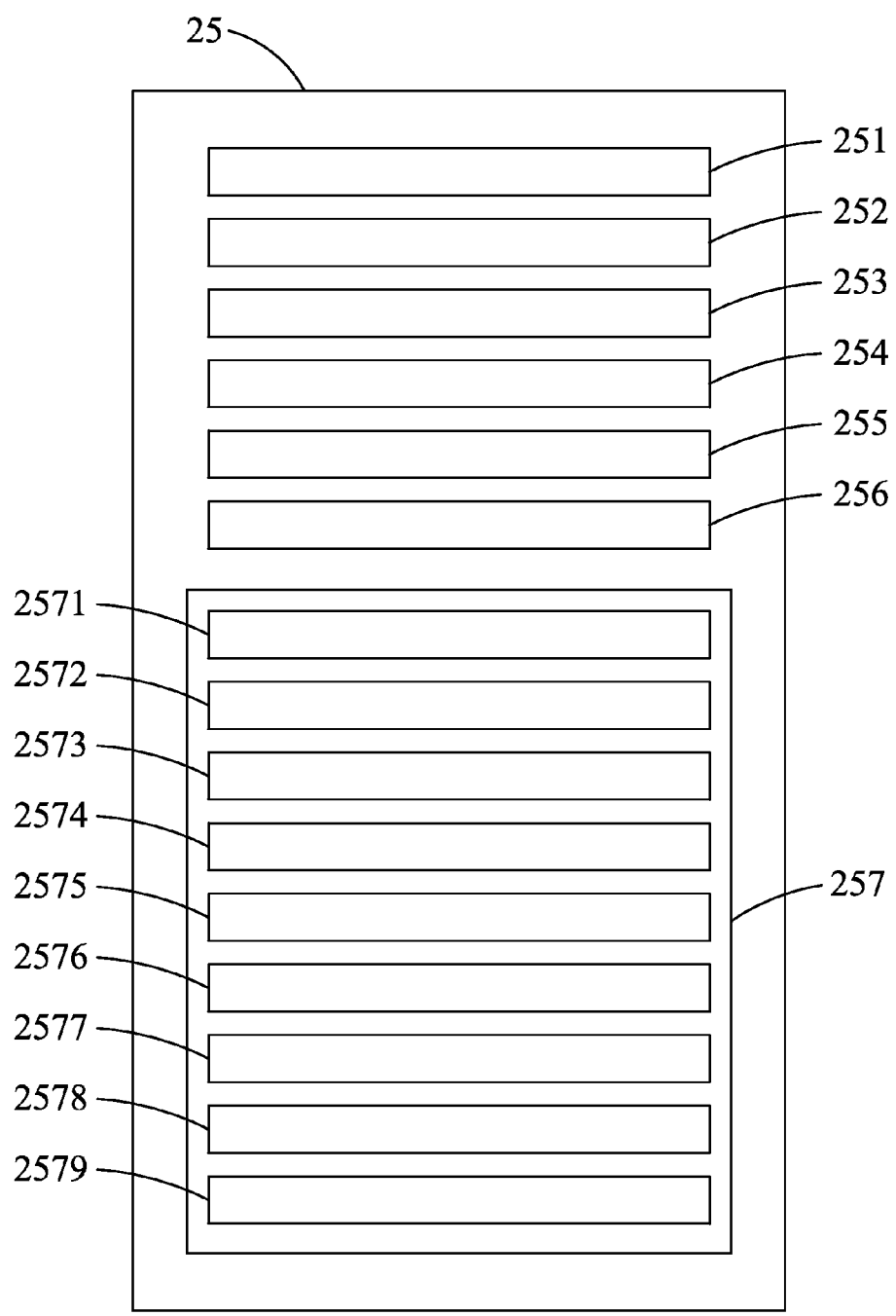
FIG. 4 is a preferred embodiment of the digital I/O module in accordance with the present invention.

Referring now to FIG. 4, the digital I/O module 25 of the present invention can include a raindrop sensor 251, an infra-red sensor 252, an ultra-violet sensor 253, a smoke sensor 254, a reed sensor 255, a power interrupt sensor 256, and a switch module 257; in which the raindrop sensor 251 is to detect the rainy state of the monitored environment 31, the infra-red sensor 252 is to detect the security state of the monitored environment 31, the ultra-violet sensor 253 is to detect the existence of a fire in the monitored environment 31, the smoke sensor 254 is to detect a possible fire in the monitored environment 31, the reed sensor 255 is to detect the door-switch state of the monitored environment 31, the power interrupt sensor 256 is to detect a possible power interception in the monitored environment 31, and the switch module 257 is to control at least one switch of the apparatus.

Referred also to FIG. 4, the switch/switches of the apparatuses to be controlled by the switch module 257 can include at least one motor switch 2571, at least one refrigeration and air-conditioning switch 2572, at least one fan switch 2573, at least one fogger switch 2574, at least one water screen switch 2575, at least one sunshine switch 2576, at least one heating rod switch 2577, at least one sprinkle switch 2578, and at least one rainshed switch 2579. The motor having the switch 2571 can be used to transport the water of the fish pool; for example, to vacuum out the aged water of the fish pool and to convey the fresh water into the fish pool that requires water-refilling. The switch 2572 for the refrigeration and air-conditioning can be used to activate the temperature-modulating in the monitored environment 31, such as the temperature-modulating for egg-hatching, or the cold water-circulating for cultivating deep-sea crabs, fishes and shrimps. The rainshed switch 2579 can extend the rain shelter to protect the soil of the chicken farm from being soaked by the rain. The sunshine switch 2576 is used to control the sunshine period of the days so as to further control the blossom time of the plant and the production of the egg-hatching as well. The fogger switch 2574 can produce in-time fog to maintain moisturized and keep down the temperature, such that a favorite moisturized environment for cultivating mushrooms and a temperature-control hog pen can be obtained. The fan controlled by the switch 2573 can adjust the temperature of the monitored environment 31 so as able to regulate the air quality thereinside. The sprinkle switch 2578 provides immediate safety protection against an accident fire, and additionally can be helpful for cleaning the livestock such as pigs. The water screen switch 2574 is usually formed as a net structure. While water passes the net-structured water screen, a water screen can be formed to perform heat exchange with the air of the monitored environment 31 driven by a ventilation apparatus. Then, the temperature of the monitored environment 31 can be reduced.

Figure 5:
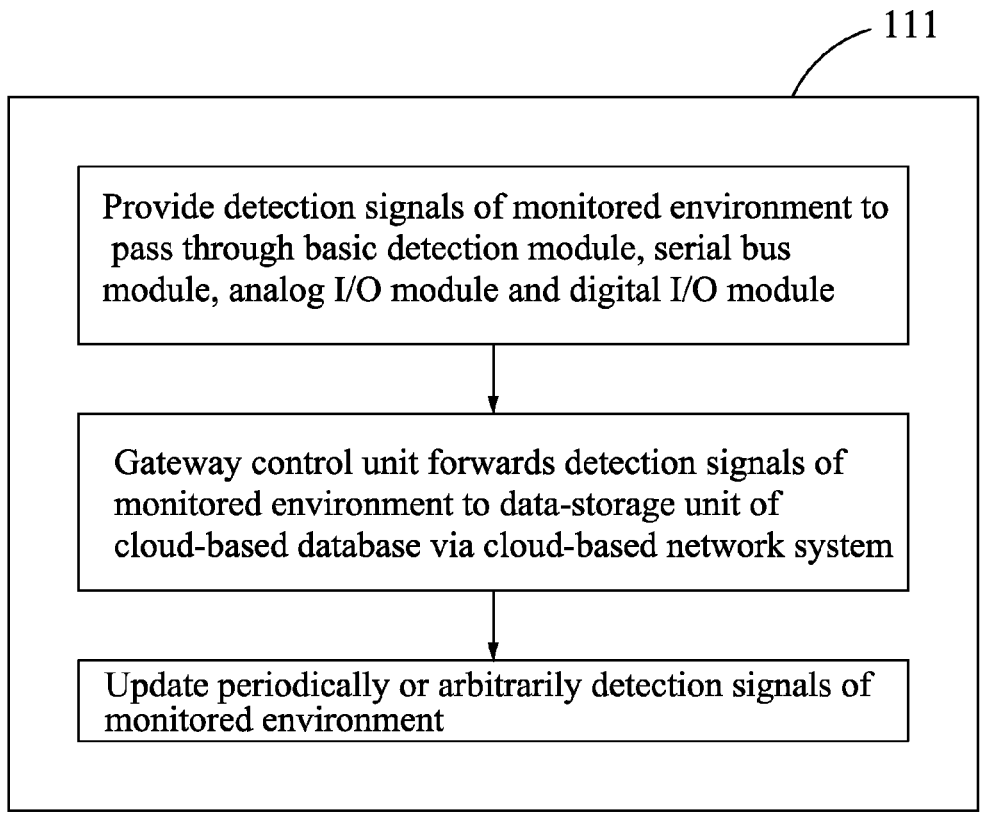
FIG. 5 is a preferred embodiment of the data-storage module in accordance with the present invention.

The cloud-based database 11 of the present invention includes a data-storage module 111, an alarm/message notification module 112, and a switch-state determination module 113, an update module 114, and a backup module 115. The data-storage module 111, as shown in FIG. 5, is to provide the detection signals of the monitored environment 31 to pass through the basic detection module 22, the serial bus module 23, the analog I/O module 24, and the digital I/O module 25. The gateway control unit 21 further forwards the detection signals of the monitored environment 31 to a data-storage unit of the cloud-based database 11 via the cloud-based network system 12. The detection signals of the monitored environment 31 are periodically or arbitrarily updated in the data-storage unit.

Figure 6:
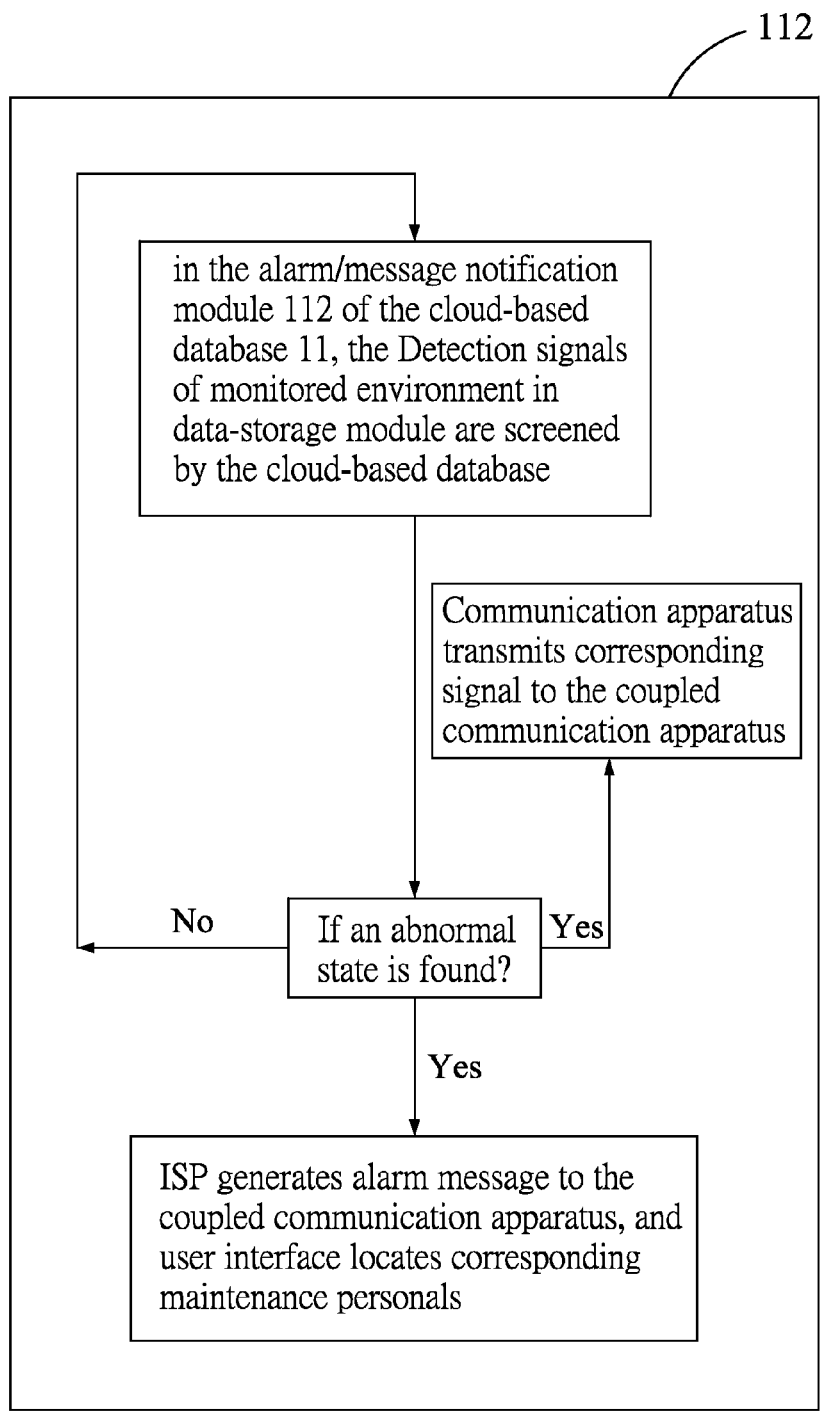
FIG. 6 is a preferred embodiment of the alarm/message notification module in accordance with the present invention.

As shown in FIG. 6, in the alarm/message notification module 112 of the cloud-based database 11, the detection signals of the monitored environment 31 in the data-storage module 111 are screened by the cloud-based database 11. If an abnormal state is found in the detection signals, the ISP 51 generates an alarm message to the coupled communication apparatus. Also, the maintenance manager of the monitored environment 31 can use the user interface to locate the corresponding maintenance personals. Alternatively or performed at the same time, while an abnormal state is found in the detection signals, the communication apparatus 26 would transmit a corresponding signal to the communication apparatus. As soon as the detection signals are judged to be normal, the screening by the cloud-based database 11 upon the detection signals of the monitored environment 31 in the data-storage module 111 is resumed.

Figure 7:
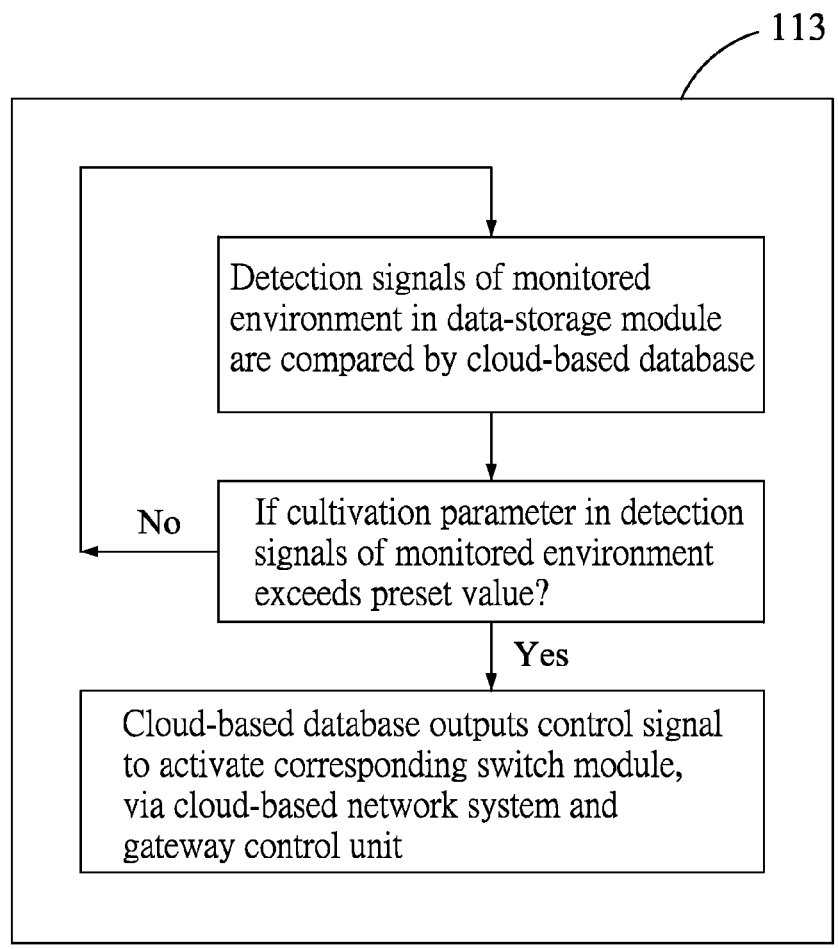
FIG. 7 is a preferred embodiment of the switch-state determination module in accordance with the present invention.

Referring now to FIG. 7, in the switch-state determination module 113 of the cloud-based database 11, the detection signals of the monitored environment 31 in the data-storage module 111 are compared by the cloud-based database 11 to determine if a cultivation parameter is normal or not. If the cultivation parameter in the detection signals of the monitored environment 31 exceeds a preset value, the cloud-based database 11 would output a control signal to activate the corresponding switch module 257, through the cloud-based network system 12 and the gateway control unit 21. If the cultivation parameter in the detection signals of the monitored environment 31 does not exceed the preset value, then the cloud-based database 11 keeps collecting and further judging the detection signals of the monitored environment 31 from the basic detection module 22, the serial bus module 23, the analog I/O module 24, and the digital I/O module 25. In the cloud-based database 11, the update module 114 is to perform synchronically data updating, and the backup module 115 is to prepare backup data to the cloud-based monitoring apparatus.

Figure 8:
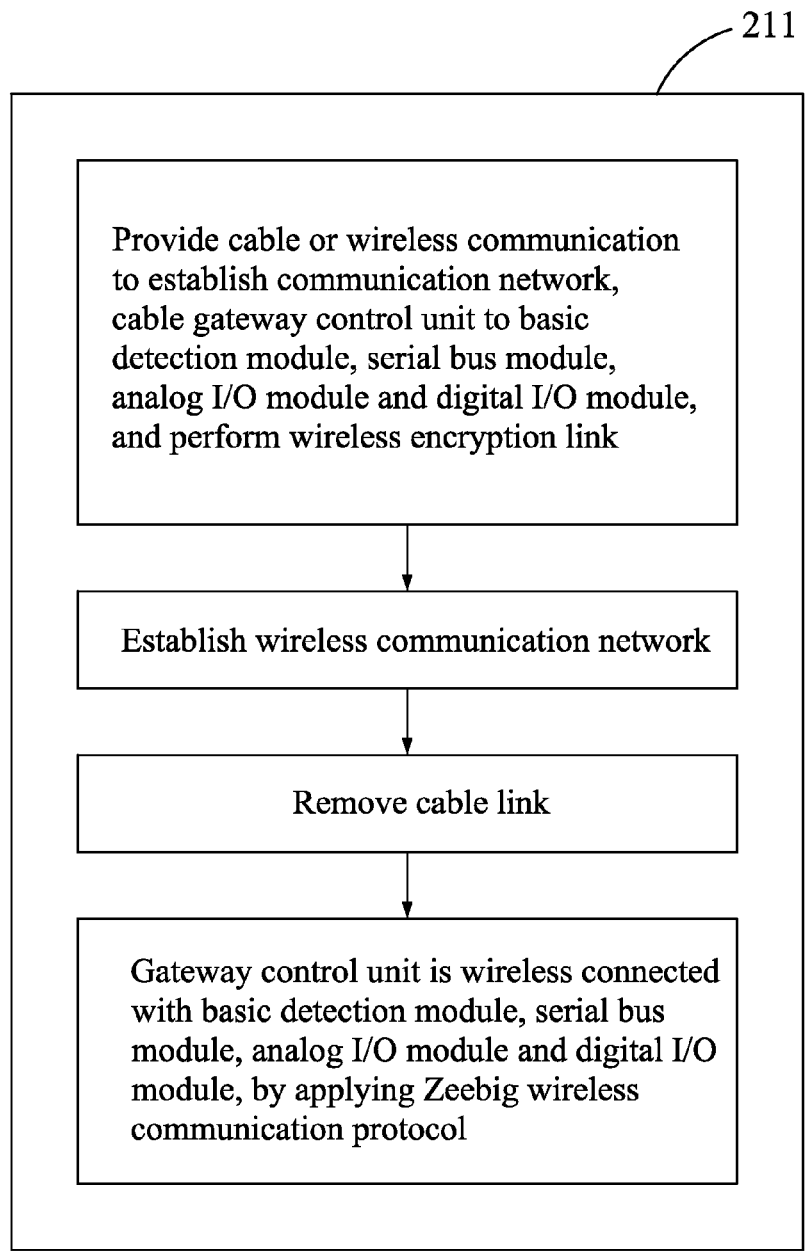

In the present invention, the gateway control unit 21 includes a gateway communication module 211 and a safety module 212. The gateway communication module 211 as shown in FIG. 8 is to provide a cable communication or a wireless communication so as to establish a communication network. Upon such an arrangement, firstly cable the gateway control unit 21 to the basic detection module 22, the serial bus module 23, the analog I/O module 24 and the digital I/O module 25, then perform wireless link (encryption or non-encryption) to all above units and modules so as to establish a wireless communication network, and finally remove the cable link such that the gateway control unit 21 is now wireless connected with the basic detection module 22, the serial bus module 23, the analog I/O module 24, and the digital I/O module 25. In the present invention, the wireless communication protocol can be a Zeebig wireless communication protocol.

Figure 9:
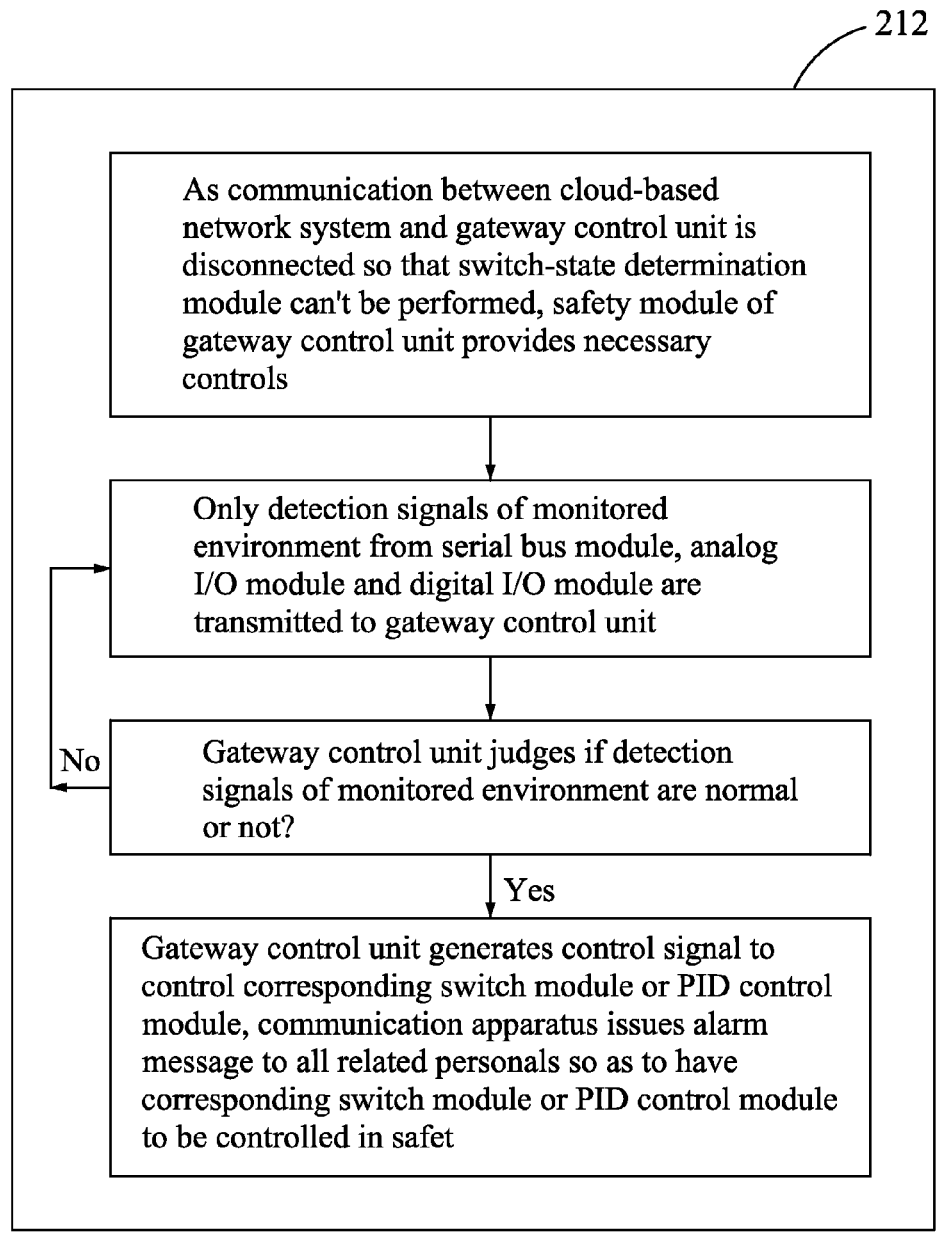
FIG. 9 is a preferred embodiment of the safety module in accordance with the present invention; safety module.

FIG. 9 shows the operations in the safety module 212. In the safety module 212, as the communication between the cloud-based network system 12 and the gateway control unit 21 is disconnected, then the switch-state determination module 113 can't be performed. At this time, the safety module 212 of the gateway control unit 21 can provide the necessary controls. Namely, while the aforesaid disconnection is met, the basic detection module 22, only the detection signals of the monitored environment 31 from the serial bus module 23, the analog I/O module 24, and the digital I/O module 25 can only be transmitted to the gateway control unit 21, and the gateway control unit 21 proceeds to judge if the detection signals of the monitored environment 31 are normal or not. If necessary, the control signal to correct any abnormality is issued by the gateway control unit 21 so as further to control the corresponding switch module 257 or PID control module 246. Also, the communication apparatus 26 is activated to issue an alarm message to all related personals so as to have the corresponding switch module 257 or PID control module 246 to be controlled in safety states. Thus, all the monitored parameters of the monitored environment 31 can be stably controlled within the corresponding safety states. If the detection signals of the monitored environment 31 are judged to be normal, then the detection signals of the monitored environment 31 from the basic detection module 22, the serial bus module 23, the analog I/O module 24, and the digital I/O module 25 are only transmitted to the gateway control unit 21 for being judged if the detection signals of the monitored environment 31 are normal or not.

In the present invention, the mobile apparatus 13 includes a display unit 131, a user interface module 132, a verification module 133, a monitoring module 134, an abnormal alarm module 135 and a formulistic empirical module 136. The mobile apparatus 13 of the present invention can be one of the mobile phone, the computer application program, or the webpage. The user interface module 132 is to display the detection signals and the monitor parameters of the monitored environment 31 in the data-storage module 111 onto the display unit 131. The user interface module 132 provides a control module to remotely control the serial bus module 23, the analog I/O module 24, and the digital I/O module 25. Through the verification module 133 to distinguish the retailer group and the customer group and to further determine the user's authorization, then the mobile apparatus can be directed into the corresponding user interface module 132. After the retailer group is verified by the verification module 133, the monitoring module 134 is introduced to setup or adjust the corresponding monitor parameters. In the data-storage module 111, as the detection signals of the monitored environment 31 are judged to be abnormal with respect to the corresponding monitor parameters, the abnormal alarm module 135 would generate an abnormal signal to be displayed on the display unit 131. The formulistic empirical module 136 is to provide the cultivation database, to increase the cultivation efficiency, and to furnish the empirical cultivation parameters for data researching, lowering the cultivation entry barrier, reducing the loss, and benefitting the green-hand clients. The aforesaid empirical cultivation parameters, including the liquid medicine/liter, ratio of the feeding stuffs, and so on, can further increase the cultivation density, promote the management efficiency and yield, and record/compare the growth curve, temperature curve, humidity curve, luminance curve, consumed electricity analysis, the chicken survival rate and so on, so as to adjust the cultivation strategy, improve the recipe of the feeding stuffs, change the dosage, modify the cultivation parameters, and control the medications, such that the energy can be saved, the survival rate can be improved, and the cultivation quality can be enhanced.

In the present invention, switches controlled by the digital I/O module 25 can further include: a video recorder switch, a video player switch, a VCR switch, a disc playback machine switch, a belt video player switch, a cassette recorder switch, a disc recorder switch, a TV switch, an amplifier switch, a computer speaker switch, an LCD TV switch, an audio switch, a video-cassette switch, a radio broadcasting switch, a digital photo frame switch, a shutter switch, a computer LCD monitor switch, a computer monitor switch, a mainframe computer switch, a personal computer switch, a network server switch, a platform scale switch, an electronic scale switch, a camera switch, a slide switch, a projector switch, an automatic indication switch, a spring balance switch, a scale switch, a precision scale switch, an electrical machinery/appliance switch, and so on. The apparatus for loading the digital I/O module 25 can include: a computer cooling fan, a light blinking controller, an AC to DC voltage converter, a buzzer, an air door, a thermostat, a humidistat, an odor generator, an automatic door switch controller, a fluid sensor, a flash controller, a photoelectric sensor, an infrared thermal detector, a magnetic reed switch window, a Wu fuse switch, a solenoid lock switch, a touch switch, a limit switch, a microwave sensor, a button, a switch, a lighting controller, a pressure controller, a water level controller, a computer button switch, a microswitch, a proximity switch, a temperature switch, a photoelectric switch, a battery charger, a coin-operated parking gate, an automatic turnstile, an electric door switch, a solenoid valve, a solenoid pilot valve, an electronic siren, an alarm, an electronic light-off, a remote equipment, a solid state relay, a vending machine, a power company, an electronic lock, a medical power supply, an answering machine, a welding iron, a welding clamp, an electric torch, an electric iron head, an arc cutting equipment, a switch, a relay, a distribution board, a fire pump machine, a fire sprinkler mover, a fire warning light, a flame sensor, a flame detector, a fire alarm, a heat sensor, a smoke alarm, a fire dispatch switchboard, an automatic fire smoke machine, a manual fire transmitters, a temperature sensing automatic fire alarm, a gas alarm, a gas sensor, a smoke sensor, a smoke detector, a seismic alarm, a fire sprinkler system, a traffic light, a traffic-sign card, a light, a luminous or mechanical signal sign, a siren, an LED-light label, a warning appliance, and so on.

In the present invention, devices connected with the analog I/O module 24 and the serial bus module 23 are not limited to the aforesaid water quality detection module 241, gas detection module 242, current detection module 243, voltage detection module 244, special temperature detection module 245, PID control module 246, fingerprint identification machine 231, IC access card reader 232, weight recorder 233, radio frequency identification device (RFID) 234, iris recognition device 235, pluviograph 236, mobile object flow recorder 237, and temperature controller 238, but also can include: an odometer, a tilt meter, a limiter, a micrometer, a vernier gauge, a length gauge, a theodolite, a level meter, a level, an angle meter, an electronic rangefinder, a proportional viewfinder, a cursor caliper gauge, a measuring vessel, a rotary deviation meter, a singing head angle corrector, an expanded viewer of measuring equipment, a material-altitude indicator, a thermometer, a calorie meter, an oil pressure gauge, a vacuum gauge, a speedometer, a wind instrument, a compass, a density meter, a piezo-meter, a rotary meter, an rpm meter, a level meter, a flow meter, a pressure gauge, a hardness meter, an air table, a hydrometer, a gas hydrometer, an acid hydrometer, a water level gauge, a depth gauge, a rain gauge, an anemometer, a tire pressure table, a tire balancer, a vacuum gauge, an automatic quantitative meter, a pressure indicator, a liquid column pressure gauge, a tension measurement fishing ring, a static level measurement, a vibration level gauge, a mileage billing stator, a transport tachograph, a bicycle speedometer with odometer, a Rally meter, a meter box, a voltmeter, an ohmmeter, a current meter, an ammeter, a voltmeter, a conductivity meter, a micro-electronic measuring device, an electromechanical level measurer, a power system phase meter, a micro-current ohm meter, an ohm meter, an automotive circuit detector, a power factor table, an amount-current meter, an electric impedance meter, an analyzing spectrometer, a spectrum analyzer, a network analyzer, an analog synthesis Internet analyzer, a frequency meter, a frequency counter, a level detector, a swing waveform analyzer, a low-frequency waveform analyzer, a level meter, a sonar, a phoneme count, a sonar fish detector, a sonar depth sounder, a signal to noise contrast meter, a photometer, an optical density meter, a spectrometer, a photometry, a fluorescence meter, a fluorescence spectroscopy meter, a water meter, a graduated cylinder, a measuring cup, a measuring tube, a flask, a gas meter, a compass, a namely ball control, a deep-sea measuring machine, a center machine, a position measuring device, an automotive instrument, a stamp counter, a gas leak detector, a gas flow indicator, a rock displacement meter, a water vapor measurer, a fuel flow rate indicator, a freezing point meter, a thickness gauge, a level meter, an energy consumption measurement unit, a total in-water suspended solid meter, an adjusting measurer for racket strings, a multi-channel particle size measurement device, an alcohol meter, a gasoline meter, a total fat meter, a total refrigerant automatic nephelometer, an oxygen concentration meter, a gas meter for oxygen detector, a viscometer, a dissolved oxygen measurer, a pH measurement probe, a maximum oxygen intake meter, a pH with temperature detector, a transformer insulating oil containing gas analyzer, an AC potentiometer, a polarimeter, a radiation meter, a fuel gauge, a fuel gauge, a counter, a optical rangefinder, a tachometer, a power meter, a level meter, a humidity meter, a caliper gauge, a leak detector, an oil pressure gauge, a conductivity meter, a showing pressure meter, a flow meter, a density meter, an altimeter, a height meter, a probe, a watt meter, a volt meter, a decibel meter, a liquid meter, a tension meter, a metal detector, a refrigerant gauge, a voltage detection pen, a paper pulp consistency meter, a gas meter (measuring instrument), a measuring weight meter, a pump table, a golf protractor, a thickness gauge, a UV intensity meter, a trace mercury, an accelerometer, a light meter, a circuit, a refractometer rate area meter, a volume meter, a vibration meter, a level meter, a temperature and humidity instruction sheet, a measuring torque meter, a water temperature gauge, a coordinate tester, an alcohol concentration measurer, a noise meter, a mount, an electronic pulse measurement device, a flow meter, a tire corrector, a wide measuring gauge, a micrometer, a gravity meter, a dial indicator, a potentiometer, a positioner, a measuring rod, a director of Miriam, a Seismic gauge, a measurement standard meter, a parking meter for time charges, a water quality analysis machine, a capacitance meter, an inductance meter, a pressure gauge, a fountain meter, a sextant meter, a measuring rope, an alidade, a linked into account meter, a circuit automatic measurer, a pedometer, a color meter, an acid-measuring meter, an acid-battery test meter, an air analytical instrument, an alcohol hydrometer, a food analyzer, a calibration diameter circle, a measuring chain, a valve pressure indicator embolism, an alcohol meter, a line counter, a measuring instruments a distance measuring equipment, a leakage indicator, a power loss indicator, an electrical measuring instrument, a vehicle odometer instrument, a balancing equipment, a dynamometer, a gas detector, a level gauge, a measuring rod, a goniometer, a slope indicator, a slope meter, a slope indicator, a speed indicator, a precision measuring instrument, an optical instrument for micro-screws, an octant, a skin thickness measuring instrument, a sub-meter, a non-medical thermometer, a scientific probe, a sonar equipment, a ball diameter meter, a dosimeter, a water veins wand detector, a speed measuring device, an exposure meter, a number indicator, a counterfeit detector, a comparing analyzer from recording instrument, a weather balloon, a postmark inspection device, a postmark testing, a numerical aperture meter pan with vibration detector capacitance tester, a material testing equipment, a material testing machine, a tensile testing machine, a material testing machine, a circuit tester, an integrated circuit tester, a thermal shock test, a carburetor test bench, a flatness tester, an electronic torque tester, a vibration, an electronic machinery detector, a linear circuit tester, an iron concentration detector, a logic circuit tester, an air flow tester, an inductance and capacitance resistance tester, an audio response test, a clock tester, a tensile testing machine, a dynamic electronic load tester, a hybrid integrated circuit automatic detector, an insulation tester, a pH tester, a broken weft detector, an AC magnetic flux detector, a printed circuit board circuit tester for automatically synchronizing the test table, an interior luminosity tester, a hardness tester, a stereo amplifier for automatic measuring devices, a light source color detector, a metal reaction tester, a garage test set, an explore warp detector for measuring the emulator, a tensile testing machine, an offset detector, an auto computer testing equipment, a resistance compression testing machine, a diode detector, an automatic optical inspection machine, a banknote identification machine, a free soldering circuit design test board, a leakage detector, a windsock, a plumb, a measuring plumb, a sounding plumb, a plumb line, a weather instrument, a navigation equipment, a measuring calculate disk, a dosimeter, an ergometer, a gas analyzer, a milk hydrometer, an instrument, a polarimeter, a pyrometer, a sugar meter, a salt meter, a bolt meter, a sulfite-determination salt meter, a fabric analyzer, a urine specific gravity wavelength meter, a stargazing instrument, a meteorological data analysis and processing instrument, a marine data analysis and processing instrument, a detector, a detector for used galena crystals, a chemical plant, a chemical equipment, a flat instrument, a amount of light meter, a cosmology instrument, a physics equipment, a physics equipment, a bathymetry, a sounding cable, a depth sounder, a milk check, a gas detector, a smoke sensor, a smoke detector, an oxygen detector, an ammonia detector, a harmful gas detector, and so on.

While the present invention has been particularly shown and described with reference to a preferred embodiment, it will be understood by those skilled in the art that various changes in form and detail may be without departing from the spirit and scope of the present invention.

What is claimed is:
1. A cloud-based monitoring apparatus, comprising:
a cloud-based network system;
a cloud-based database, connected with the cloud-based network system;
at least one gateway control unit, connected with the cloud-based network system;
at least one basic detection module, connected signally with the gateway control unit;
at least one serial bus module, connected signally with the gateway control unit;
at least one analog I/O module, connected signally with the gateway control unit;
at least one digital I/O module, connected signally with the gateway control unit; and
an Internet Service Provider (ISP), connected signally with the cloud-based database;
at least one mobile apparatus, connected signally with the cloud-based database and to remotely control the at least one serial bus module, the at least one analog I/O module, and the at least one digital I/O module;
wherein said at least one mobile apparatus comprises a verification module to distinguish a retailer group and a customer group and to further determine a corresponding user interface module;
wherein the gateway control unit, the basic detection module, the serial bus module, the analog I/O module, and the digital I/O module are all mounted in a monitored environment;
wherein each of the gateway control unit, the basic detection module, the serial bus module, the analog I/O module, and the digital I/O module has at least one monitor parameter;
wherein, the gateway control unit comprises a gateway communication module with a first operating phase and a second operating phase, and the second operating phase is wireless;
wherein the gateway control unit operates under the first operating phase to set up a pair network, and the gateway control unit operates under the second operating phase to set up a wireless communication network with the basic detection module, the serial bus module, the analog I/O module, and the digital I/O module, and then the gateway control unit switches to the second operating phase once the wireless communication network is established;

wherein the wireless communication network is a Zeebig wireless communication protocol; and wherein the first operating phase is cabled and the second operating phase further comprises removing the cable link once the wireless communication network is established.

2. The cloud-based monitoring apparatus according to claim 1, wherein the basic detection module further includes:
   a temperature sensor, for detecting a temperature of the monitored environment;
   a humidity sensor, for detecting a humidity of the monitored environment; and
   a luminance sensor, for detecting luminance of the monitored environment.

3. The cloud-based monitoring apparatus according to claim 1, wherein the serial bus module is one of a first bus interface and a second bus interface, the first bus interface is connected with at least one I/O controller respective to a first bus, the second bus interface is connected with at least one second I/O controller respective to a second bus, and peripherals controlled by the at least one first I/O controller and the at least one second I/O controller includes:
   a fingerprint identification machine;
   an IC access card reader;
   a weight recorder;
   a radio frequency identification device (RFID);
   an iris recognition device;
   a pluviograph;
   a mobile object flow recorder; and
   a temperature controller.

4. The cloud-based monitoring apparatus according to claim 1, wherein the analog I/O module further includes:
   a water quality detection module, for detecting water quality of the monitored environment;
   a gas detection module, for detecting air quality of the monitored environment;
   a current detection module, for detecting a current between 4 mA~20 mA of the monitored environment;
   a voltage detection module, for detecting a voltage between 0~10V of the monitored environment; and
   a special temperature detection module, for detecting a temperature between −80° C.~400° C. of the monitored environment;
   wherein the water quality detection module further includes:
   an ammonia sensor, for detecting an ammonia state in a water of the monitored environment;
   a dissolved oxygen probe, for detecting a oxygen state in the water of the monitored environment;
   a pH sensor, for detecting a pH state in the water of the monitored environment;
   a conductivity measuring sensor, for detecting a conductivity of the water of the monitored environment; and
   an ORP meter, for detecting a ORP state in the water of the monitored environment;
   wherein the gas detection module further includes:
   a $CO_2$ sensor, for detecting a $CO_2$ state of the monitored environment; and
   a CO sensor, for detecting a CO state of the monitored environment.

5. The cloud-based monitoring apparatus according to claim 1, wherein the digital I/O module further includes:
   a raindrop sensor, for detecting a rainy state of the monitored environment;
   an infra-red sensor, for detecting a security state of the monitored environment;
   an ultra-violet sensor, for detecting an existence of a fire in the monitored environment;
   a smoke sensor, for detecting a possible fire in the monitored environment;
   a reed sensor, for detecting a door-switch state of the monitored environment;
   a power interrupt sensor, for detecting a possible power interception in the monitored environment; and
   a switch module, to control switches of apparatuses, wherein the switches include:
   at least one motor switch;
   at least one refrigeration and air-conditioning switch;
   at least one fan switch;
   at least one fogger switch;
   at least one water screen switch;
   at least one sunshine switch;
   at least one heating rod switch;
   at least one sprinkle switch; and
   at least one rainshed switch.

6. The cloud-based monitoring apparatus according to claim 1, wherein the cloud-based database further includes:
   a data-storage module, for providing detection signals of the monitored environment to pass through the basic detection module, the serial bus module, the analog I/O module, and the digital I/O module, the gateway control unit further forwarding the detection signals of the monitored environment to a data-storage unit of the cloud-based database via the cloud-based network system, wherein the detection signals of the monitored environment are periodically or arbitrarily updated in the data-storage unit, the detection signals of the monitored environment are sent forward through the basic detection module, the serial bus module, the analog I/O module, and the digital I/O module, the gateway control unit further forwards the detection signals of the monitored environment to a data-storage unit of the cloud-based database via the cloud-based network system, and the detection signals of the monitored environment are periodically or arbitrarily updated in the data-storage unit.

7. The cloud-based monitoring apparatus according to claim 1, wherein the cloud-based database further includes:
   an alarm/message notification module, the detection signals of the monitored environment in the data-storage module being screened by the cloud-based database, the ISP generating an alarm message to a coupled communication apparatus if an abnormal state is found in the detection signals, a maintenance manager of the monitored environment using a user interface to locate corresponding maintenance personals, or a communication apparatus transmitting a corresponding signal to the coupled communication apparatus while an abnormal state is found in the detection signals, screening by the cloud-based database upon the detection signals of the monitored environment in the data-storage module being resumed as soon as the detection signals are judged to be normal.

8. The cloud-based monitoring apparatus according to claim 1, wherein the cloud-based database further includes:
   a switch-state determination module, the detection signals of the monitored environment in the data-storage module being compared by the cloud-based database to determine if a cultivation parameter is normal or not, the cloud-based database outputting a control signal to activate the corresponding switch module if the cultivation parameter in the detection signals of the monitored environment exceeds a preset value, the cloud-based database being through the cloud-based network system and the gateway control unit to keep collecting and further judging the detection signals of the monitored environment from the basic detection module, the serial bus module, the analog I/O module and the digital I/O module if the cultivation parameter in the detection signals of the monitored environment does not exceed the preset value;

an update module to perform synchronically data updating upon the gateway communication module and safety module via the gateway controller; and a backup module to prepare backup data to the cloud-based monitoring apparatus.

9. The cloud-based monitoring apparatus according to claim 1, wherein the gateway control unit further includes:

a safety module, the switch-state determination module unable to perform as a communication between the cloud-based network system and the gateway control unit is disconnected, the safety module of the gateway control unit providing necessary controls, the serial bus module, the analog I/O module and the digital I/O module only transmitting to the gateway control unit, the gateway control unit proceeding to judge if the detection signals of the monitored environment are normal or not, If necessary, the gateway control unit generating a control signal to correct any abnormality so as further to control the corresponding switch module or PID control module if necessary, the communication apparatus being activated to issue an alarm message to all related personals so as to have the corresponding switch module or PID control module to be controlled in safety states where all monitored parameters of the monitored environment are stably controlled within the corresponding safety states, the detection signals of the monitored environment from the basic detection module, the serial bus module, the analog I/O module and the digital I/O module being only transmitted to the gateway control unit for being further judged whether the detection signals of the monitored environment are normal or not if the detection signals of the monitored environment are judged to be normal.

10. The cloud-based monitoring apparatus according to claim 1, wherein the mobile apparatus further includes:

a display unit;

the user interface module, for displaying the detection signals and the monitor parameters of the monitored environment in the data-storage module to the display unit;

the verification module;

a monitoring module, to setup or adjust the corresponding monitor parameters after the retailer group is verified by the verification module;

an abnormal alarm module, to generate an abnormal signal to be displayed on the display unit as the detection signals of the monitored environment are judged to be abnormal with respect to the corresponding monitor parameters in the data-storage module; and a formulistic empirical module, to provide a cultivation database, to increase a cultivation efficiency, to be furnished with empirical cultivation parameters for data researching, lowering a cultivation entry barrier, reducing a loss, and benefitting green-hand clients, to further increase a cultivation density, to promote the management efficiency and to ensure a yield.

* * * * *